United States Patent [19]
Lewin

[11] Patent Number: 5,967,192
[45] Date of Patent: Oct. 19, 1999

[54] PROCESS AND DEVICE FOR REFURBISHING DRAINS

[75] Inventor: Hans Günter Lewin, Nürnberg, Germany

[73] Assignee: Kanal Technik Ingenieurbüro, Berlin, Germany

[21] Appl. No.: 09/011,341

[22] PCT Filed: Aug. 2, 1996

[86] PCT No.: PCT/DE96/01434

§ 371 Date: Feb. 4, 1998

§ 102(e) Date: Feb. 4, 1998

[87] PCT Pub. No.: WO97/06381

PCT Pub. Date: Feb. 20, 1997

[30] Foreign Application Priority Data

| Aug. 4, 1995 | [DE] | Germany | 195 28 653 |
| Aug. 1, 1996 | [DE] | Germany | 196 31 082 |

[51] Int. Cl.⁶ ................................. F16L 55/162
[52] U.S. Cl. ................ 138/98; 138/96 R; 138/97
[58] Field of Search ................ 138/89, 97, 98, 138/96 R

[56] References Cited

U.S. PATENT DOCUMENTS

| 782,290 | 2/1905 | Tompkins | 138/98 |
| 2,092,358 | 7/1937 | Robertson | 138/97 |
| 4,386,629 | 6/1983 | Cook et al. | 138/98 |
| 5,224,742 | 7/1993 | Ooka et al. | 138/98 |
| 5,351,720 | 10/1994 | Maimets | 138/98 |
| 5,887,626 | 3/1999 | Hugo | 138/89 |

FOREIGN PATENT DOCUMENTS

| 640 727 | 3/1995 | European Pat. Off. . |
| 39 31 616 | 4/1991 | Germany . |
| 44 10 592 | 6/1995 | Germany . |
| 29 504 647 | 8/1995 | Germany . |
| 91 07 619 | 5/1991 | WIPO . |

*Primary Examiner*—James F. Hook
*Attorney, Agent, or Firm*—Cohen, Pontani, Lieberman & Pavane

[57] ABSTRACT

A process for rehabilitating sewer pipes whereby a plurality of plastic pipes made of thermoplastics is inserted into a sewer pipe, closing off any incoming house drain inlets, and is subsequently connected to the house drain inlets. For this purpose the position of the house drain inlet in the area closed off by the plastic piping is located, and a through-hole is created in the plastic pipes in the area in which they close off the house drain inlet. The size of the through-hole is at least equal to the projection of the cross-section of the house drain pipe. A saddle-type branch fitting, having a pipe segment member and a pipe socket integral therewith and outwardly extending therefrom, is placed in the closed-off area so that the pipe socket projects into the house drain inlet via the through-hole. The pipe segment member is secured to the plastic pipe in the area of contact. A rubber sleeve with exterior sealing elements is inserted into the house pipe inlet so that one of its end portions lies firmly against the interior wall of the house drain pipe while its other end portion lies firmly against the interior wall of the pipe socket extending from the saddle-type branch fitting.

37 Claims, 5 Drawing Sheets

PROCESS AND DEVICE FOR REFURBISHING DRAINS

BACKGROUND OF THE INVENTION

1. Field of the Invention

The invention relates to a sewer pipe rehabilitation process whereby a plurality of inner liners made of thermoplastics is inserted into a sewer pipe, closing off any incoming house drain inlets, and is then connected to said house drain inlets by a method involving the creation of a through-hole theretoward in that area of the plastic piping which closes off the house drain inlet. The through-hole is at least the size of the projection of the cross-section of the house drain pipe. A saddle-type branch fitting comprising a pipe segment member and a pipe socket integral therewith and outwardly extending therefrom is positioned in the closed-off area so that the pipe socket will project into the house drain inlet via said through-hole. The pipe segment member is then secured to the plastic pipe. A sleeve with exterior sealing elements is inserted into the incoming house drain inlet so that one end portion of said sleeve is placed tightly against the interior wall of the house drain pipe while its other end portion is placed tightly against the interior wall of the pipe socket extending from said saddle-type branch fitting. The invention further relates to a device and a manipulator for carrying out said process.

2. Description of the Prior Art

The rehabilitation of sewer pipes is becoming increasingly important, both for technical reasons and as a result of a growing environmental awareness. Diverse attempts are known in the art to provide mechanized processes and devices for the rehabilitation of pipelines. Such mechanized solutions are of universal interest, given that working conditions are already difficult in walk-through pipes, while in the rehabilitation of non-walk-through pipes they are such as to make mechanized aid altogether indispensable. A particular difficulty lies in the rehabilitation of pipelines near house drains terminating in the sewer.

A prior process and apparatus for the rehabilitation of sewer pipes is known from DE 39 31 616 C 2. According to this publication, plastic pipes made of a thermoplastic material are first inserted into a sewer pipe. Inside the sewer pipe thus lined. A deformation member is then positioned with the aid of a carriage before an incoming house drain inlet, which is initially closed off by the wall of the plastic piping. The deformation member is then pressed against the wall of the plastic pipe from the inside of the sewer pipe, and is heated so as raise the temperature of the plastic pipe until the latter becomes plasticized. The deformation member is then forced into the house drain inlet, forming a socket of that area of the plastic pipe material which had initially closed off the house drain inlet. This socket is then trimmed, and the deformation member is retracted towards the carriage. No special sealing is provided in the annular space between the plastic pipe and the house drain inlet.

The disadvantages of such a solution include the fact that, inter alia, the process can only be used with thermoplastic material, while the geometry of the socket thus formed cannot be exactly defined in advance. Variations will be found both in the wall thickness, and hence the strength, as well as in the length of the socket. Moreover, there is virtually no sealing between the socket and the house drain inlet. This is a result of the fact that the junction is fabricated in-situ, i.e., subject to operating conditions and procedures which cannot be controlled with any degree of precision. In addition, this process requires the center of the house drain inlet to be determined with particular accuracy, since a satisfactory result can only be obtained if the socket is properly centered. Another problem with this solution lies in the fairly large equipment dimensions involved, making the apparatus suitable only for use in sewer lines of appropriately large diameter.

EP 0 640 727 A1 discloses a process and apparatus for connecting and sealing a lateral inlet or house sewer to a main sewer pipe to be rehabilitated with a thermoplastic inner liner. With this system a thermoplastic pipe socket having a flange and an outwardly projecting cylindrical portion integral therewith which extends into the lateral inlet is thermally fused with the inner liner. For this process a cylindrical insert or sleeve, having exterior sealing strips on its end portions, is inserted with the aid of a heatable expander device positioned therein. Once the cylindrical portion and the sleeve have been heated to the point of softening, they are expanded by the expander device so as to be placed firmly against the lateral inlet, with the front sealing strips engaging the interior wall of the lateral inlet and the rear sealing strips engaging the interior wall of the cylindrical portion of the pipe socket, whereupon the expander device is removed.

A drawback of this process lies in the fact that the thermal fusion process whereby the plastic pipe socket is joined to the inner liner may produce questionable and unreliable results in the presence of moisture and in difficult-to-clean mounting locations. Moreover, the strain on the junction due to thermally induced shear stress and other effects will be so intense as to become virtually unmanageable with plastic sockets and saddle-type fittings in a reasonable wall gauge range, particularly if significant restrictions in cross-sectional area are to be avoided.

SUMMARY OF THE INVENTION

The present invention is based on the technical problem of improving a process for the rehabilitation of sewer pipes including the associated house drain inlets, and of proposing the requisite devices and manipulators, so as to allow the rehabilitation of house drain inlets with sufficiently strong saddle-fittings and pipe sockets of definable dimensions and effective sealing properties. The inventive device should be suitable for fully mechanical installation specifically in smaller-diameter pipes which constitute by far the largest portion of today's sewage systems.

This problem is solved according to the invention by heating the plastic pipe to its plastification point in its area of contact with the saddle-type branch fitting, and by forcing the saddle-type branch fitting, which is made of metal and preferably of stainless steel, radially outward with its pipe segment member (the latter having a textured exterior surface) so that it becomes attached through form-fit engagement to the plastic material by said texture of its exterior surface.

The invention furthermore provides a device as well as a manipulator for performing the process according to the invention, said device comprising at least one saddle-type branch fitting consisting of a pipe segment member carrying a pipe socket integral therewith and outwardly extending therefrom, as well as a sleeve with outwardly disposed sealing elements on its end portions for sealing the house drain inlet, wherein said saddle-type branch fitting is made of metal, and preferably of stainless steel, its pipe segment member taking the form of a sheet metal panel that extends significantly beyond the house drain both axially and circumferentially and matches the diameter of the plastic piping. Integral with said sheet metal panel is a pipe socket branching off outwardly and having an outside diameter slightly inferior to the inside diameter of the house drain. The sleeve is made of an elastic material, preferably rubber.

The manipulator moves inside the inner liner or plastic piping inserted into the sewer pipes to be rehabilitated. It identifies the exact position of incoming house drain inlets with a high degree of accuracy, and is then placed near the house drain inlets thus identified so as to be able to produce a through-hole toward the house drain inlet in the plastic piping and to position a saddle-type branch fitting in such a manner that the pipe socket thereof will project into the house drain inlet. In addition, the manipulator comprises operating means for joining the saddle-type branch fitting firmly with the plastic piping at its point of contact therewith, and for inserting a rubber sleeve into the pipe socket (and into the house drain pipe enclosing it) so that the exterior sealing elements of that sleeve are placed tightly against the interior wall of the house drain pipe at the front sleeve end and against the interior wall of the pipe socket at the rear sleeve end.

There are various processes known in the art for rehabilitating sewer pipes by inserting plastic piping. Given the different material properties, the processes developed for piping made of thermosetting plastics (i.e., the so-called hose relining method) are different from the rehabilitation methods based on the use of thermoplastic pipes. However, a major problem common to all of these processes lies in the recreation of tight, positive form-fit junctions at house drain inlet points. The differences associated with the various plastics are also reflected in the process according to the invention. With thermoplastic pipes, the fitting is secured by pressing the pipe segment member against the plastic previously plasticized by heating. This causes the surface texture elements to be embedded in plastic material which subsequently solidifies as its temperature decreases, resulting in a positive form-fit connection between the saddle-type branch fitting and the plastics. For reasons inherent in this process, such connections are typically capable of resisting high moments and will avoid the problems arising, for instance, if an attempt is made to produce a homogeneous or integral material joint by welding. For the solution according to the invention, therefore, the fact that the saddle-type branch fitting is made of metal, and specifically stainless steel, provides significant benefits.

Moreover, the process according to the invention does not require a high degree of accuracy in locating the branch-off point. On principle, it will suffice if this locating operation is accurate enough to ensure that a pilot hole can be drilled within the circumference of the house drain inlet orifice and that the through-hole can then be created, i.e., with an automatic milling cutter, so as to coincide with the projection of the cross-section of the house drain pipe, starting out from the pilot hole and maintaining due alignment with the interior wall of the house drain pipe and its axis. The use of a saddle-type branch fitting precision-manufactured under workshop conditions has the benefit of making the resulting accuracy available and transferable to the house drain junction.

The curvature of the pipe segment member can be accurately adapted to the diameter of the plastic pipe, while the arrangement of the integral pipe socket must be such as to accommodate the branch-off angle. Nevertheless, it can be ensured with this system that the saddle-type branch fitting remains small enough to allow it to be moved up to the junction point through the plastic pipe without problems. This is achieved, on the one hand, by ensuring that the dimensionally stable saddle-type branch fitting, bent to match the circumferential curvature of the inner liner, extends through less than 180 angular degrees in the circumferential direction. On the other hand, installation is facilitated by producing the saddle-type branch fitting from a flexible metal and with a circumferential length which is approximately equal to the interior circumference of the liner. The saddle-type branch fitting can thus be rolled up, with its ends overlapping, into a tubular shape having a diameter which is significantly less than the inside diameter of the inner liner, and can then be expanded from within, by a pressure directed radially outwards, into a type of pipe sleeve with attached socket, with the diameter of said pipe sleeve corresponding to that of the liner.

At the junction point the saddle-type branch fitting is positioned with its pipe socket projecting into the house drain pipe via the through-hole. Once the contact area has been plasticized by heating, the fitting is mounted in such a manner that its pipe segment member adheres firmly to the contact area on the plastic liner while the pipe socket is approximately centered with the house drain pipe and projects far enough into the latter for an annular area extending along the outer circumference of the pipe socket to lie approximately within the range of a corresponding annular inner area of the house drain pipe, and aligned with the latter, within the house drain pipe. The width of this annular area must be selected such that the sealing elements (e.g., sealing ribs) resting against the pipe socket within the house drain pipe, will encounter a sufficiently large sealing surface and can exert the requisite contacting force in a radially outward direction, for which purpose appropriate supporting forces will build up within the annular element.

The saddle-type branch fitting is made of metallic materials. This provides a plurality of benefits. Firstly, the fitting will exhibit a very high stability and strength even with wall thicknesses low enough to avoid or minimize a restriction of the cross-sectional flow area. Shear stress, e.g. due to temperature differences, and other loads will thus remain reliably manageable. On the other hand it is possible, in an slight variation of the process, to heat the saddle-type branch fitting and to plasticize the plastic liner by placing the fitting on its surface. But even with the preferred embodiment, which involves initial heating of the liner using a separate heat source (e.g., an infrared lamp) and subsequent pressing of the branch fitting (preferably non-heated) against the plasticized plastic liner, the geometrical stability of the branch fitting provides significant benefits. The process of pressing the pipe segment member radially into the plastic pipe, e.g., with the aid of a packer unit, can be advantageously controlled in such a manner that the plastic pipe will be slightly expanded in the plasticized contact area, so that the inside surface of the pipe segment member will generally not project radially inwards beyond the inside surface of the plastic pipe not so deformed.

While the inner surface of the pipe segment member will advantageously always be hydraulically smooth, its exterior surface facing the liner will be textured to exhibit a certain macro-roughness. An exterior surface of this type allows the creation of a form-fit engagement between the elements forming this macro-rough surface and the thermoplastic material. Such macro-roughness can be obtained by an appropriate cutting or grooving (i.e., surface conditioning) process, or by the attachment of perforated sheet metal. Particularly advantageous results are obtained with a piece of expanded metal secured by spot welding. In a similar way, holes may be provided to ensure the form-fit engagement with the thermoplastic material, an effect which is favourably enhanced by an outside-to-inside taper of these holes.

The embodiment of the saddle-type branch fitting, which extends through less than 180 angular degrees in the circumferential direction while exhibiting a geometrically stable curvature matching the interior curvature of the liner, allows the connection to be made with overlap in the area immediately surrounding the junction point. Its design in the form of a pipe sleeve covering the entire interior circumference of the liner near the junction area has the advantage of providing a stable support and reliable form-fit engagement all around, even with macro-roughness elements of small radial extension.

In the embodiment of the pipe segment member having a plurality of holes outside an annular area surrounding the integral pipe socket, the edges of these holes expand conically from the outside toward the inside. This design allows the plasticized material to penetrate through the holes as the saddle-type branch fitting is forced into position and to effectively engage the conical edges of said holes upon solidification of the plastic, i.e., once the latter has cooled off. The form-fit connection between the pipe segment member and the plastic pipe will be effectively improved in this manner. The annular area comprising no holes is preferably sized such that its outer circumference is smaller than the circumference of the throughhole and extends beyond the latter. This prevents the occurrence of leaks in the area of the junction which might allow surrounding ground water to penetrate into the sewer system or vice versa.

There exist different designs and embodiments of metallic saddle-type branch fittings. Thus, the pipe socket may be deep-drawn from the pipe segment member and integral therewith, or alternatively, a pre-formed pipe socket may be welded to a pipe segment member having an appropriate orifice.

Sealing of the pipe-socket relative to the house drain pipe (and hence, sealing of the house drain junction as a whole) is achieved by means of a rubber sleeve. This rubber sleeve, having end portions with stepped exterior diameters which rest against the pipe socket on the one hand and against the interior of the house drain pipe on the other, carries a plurality of exterior sealing elements on these end portions. In order to enhance the sealing effect, the rubber sleeve is pressed outward by an expansion clamping device at least in that end portion in which its sealing lips are in contact with the house drain pipe. If the sewer pipes to be rehabilitated lie submerged in ground water, it will be expedient to use such an expansion clamping device also at the other end of the rubber sleeve, where the latter is in contact via its sealing ribs with the interior surface of the pipe socket, so as to provide sealing therewith. On the other hand, if there is no need to protect the junction against penetration by ground water, it will normally suffice to enhance the sealing action by providing stiffeners which may be integrated into the rubber or else separately fitted thereto.

The device suitable for performing the sewer pipe rehabilitation process according to the invention comprises at least one saddle-type branch fitting and a rubber sleeve. The saddle-type branch fitting consists of a pipe segment member which is curved to match the plastic piping inserted into the sewer pipe for rehabilitation thereof, as well as a pipe socket integral with the fitting and extending outwardly therefrom. The rubber sleeve has two stepped-diameter portions as well as a plurality of exterior sealing elements in its end areas. On that of its end portions which is intended for sealing the pipe socket and therefore larger in its unconstrained as-manufactured condition, these sealing elements are preferably in the form of sealing ribs, while in the other end portion subsequently expanded to provide a seal with the interior wall of the house drain pipe, they are in the form of sealing lips. Moreover, the rubber sleeve end intended to be inserted into the house drain pipe is advantageously provided with a sealing cone having its pointed end facing outwardly upwards, and is preferably of nearly the same diameter as the inside of the house drain pipe.

In order to enhance the sealing action of the rubber sleeve relative to the house drain pipe and, under certain conditions, relative to the pipe socket, an expansion clamping device is provided which forces appropriate portions of the rubber sleeve against the interior wall of the pipe junction and remains in situ. For the purposes of achieving a tight seal with the house drain pipe the use of this device will be advantageous in any case in view of the typical surface conditions encountered on such pipes, while for sealing with the smooth precision-manufactured pipe socket its utilization may appear expedient particularly if the sewer section to be rehabilitated is exposed to ground water pressure and the sleeve must resist exterior compression forces. A suitable expansion clamping device would be a self-locking open clamping ring, for instance, whose ends overlap in the circumferential direction. Such a clamping ring can be expanded to its required width in a known manner by exerting an expansion pressure from within the ring, e.g., by means of a pneumatically inflatable packer unit, and can then be automatically locked in this position. In another embodiment the clamping device is an annular leaf spring which overlaps approximately twice in its circumferential direction. One benefit of using such a spring is that it will continue to expand on its own in the event of changing installation conditions. This effect is maintained after the spring is fitted.

Another advantage of a spring is that it can be simply "armed" (i.e., released from a tensioned state in which it is compressed to a smaller diameter to facilitate installation) by an operating element of the manipulator. The same operating element is used to place the spring in its sealing position, as will be explained in greater detail below.

Guidance of the spring windings can be advantageously achieved by providing the annular leaf-spring with at least one bead in its circumferential direction for mutual engagement between its overlapping portions. This bead may be directed radially outwards or inwards, although an outwardly facing bead may be advantageously accommodated in the rubber sleeve.

If there is no risk of ground water exposure at the rehabilitation site, or where increased sealing forces are not necessary for other reasons, the use of stiffeners may be sufficient to provide improved sealing with the pipe socket. Such stiffeners have the advantage of being easy to manufacture and simple to use. Intended to reinforce the sealing action of the exterior sealing ribs in the end portion of the rubber sleeve, these stiffeners keep the diameter of the sleeve exactly matched to the inside diameter of the pipe socket. They are preferably in the form of flat rings which may be integrated into the material of the rubber sleeve or manufactured separately and positioned together with the sleeve. The resulting stiffening of the rubber sleeve will normally suffice to maintain the sealing action. Moreover, the flat design has the advantage of avoiding a further restriction of the interior cross-section of the house drain junction, which will be somewhat reduced in any case.

The action of the sealing elements can be advantageously improved by providing them with pointed ends engaging the sealing surface along a circumferential line. This design will permit an easy compensation of even very slight irregularities in the interior walls to be sealed. The sealing cone at one end of the rubber sleeve is advantageously formed in such a manner that, for installation, it can be compressed by a spring-type clamping cap so that its pointed end will be resiliently bent inwards and held in that position, while upon removal of said spring-type clamping cap it returns to its sealing position in which it is fully applied against the surrounding pipe wall.

For implementation of the process according to the invention, including handling of the device elements, a manipulator with various operating elements is proposed. These operating elements are of modular design and can be used in a modular manner. In order to locate the inlet point of the house drain pipe or lateral feeding pipe, the longitudinal and angular position of each such junction is measured by camera inspection prior to the introduction of the plastic piping into the sewer pipe. The manipulator is equipped with appropriate length and angle detection means enabling it to locate the lateral inlets once they are closed off by the inner plastic piping, while also allowing the requisite alignment and adjustment of its operating elements. The through-hole towards the house drain in the area closed off by the plastic liner pipe is created by a device such as a milling cutter, which may be mounted permanently on the manipulator itself or may alternatively be arranged to operate upstream of the latter as an independent unit.

For use with thermoplastic material, the manipulator is equipped with a heating device for heating and plasticizing this material in the area of contact between the plastic piping and the metallic saddle-type branch fitting. This heating device comprises appropriate motion control means by which it can be maneuvered into an angular position centralized with the through-hole, and allows the plastification of the thermoplastic pipe material in the area of contact either by direct heat transfer to the plastic surface or else by heating the saddle-type branch fitting for subsequent contact heat transfer. One type of device suitable for this purpose is an infrared-based heat source, which is of advantageously small dimensions and can be appropriately adapted to site conditions.

Once the pipe material in the area of contact between the plastic piping and the saddle-type branch fitting is appropriately plasticized, the saddle-type branch fitting is pressed against this plasticized material so as to produce the form-fit engagement between the plastic pipe and the fitting. The saddle-type branch fitting is adapted to the surface of the plastic pipe either during the heating process (i.e., the plastic material is heated and plasticized concurrently with the embedding of the fitting), or else afterwards, once the thermal plastification of the material has fully occurred. The manipulator comprises appropriate pressing/lifting devices whereby a saddle-type branch fitting held therein can be forced against the liner surface. These devices may be actuated hydraulically, for instance, and can be maneuvered by appropriate motion control means into an angular position in which the saddle-type branch fitting is centralized with the house drain inlet. The pressure on the saddle-type branch fitting is exerted in a direction essentially normal to the pipe surface.

The manipulator furthermore comprises a plurality of operating elements which allow a controlled manipulation of the rubber sleeve to be installed and secured in tie transition area between the saddle-type branch fitting and the house drain pipe. For this purpose the rubber sleeve must be advanced towards the axis of the house drain pipe by the motion control device installed on the manipulator, and must then be inserted into the house drain pipe in a linear movement until the rear end of the rubber sleeve rests against the interior wall of the pipe socket extending from the saddle-type branch fitting, while the front end of the rubber sleeve lies on a level with the interior wall of the house drain pipe and approximately centered therewith. In this condition the rear end of the rubber sleeve is situated within the pipe socket.

To achieve a waterproof seal between the rubber sleeve and the interior wall of the house drain pipe, the sleeve is provided with an expansion clamping device which may, for instance, consist of a self-locking clamping ring. The manipulator is equipped with an operating element (e.g., a packer unit actuated my mechanical, pneumatic or hydraulic means) designed to expand this clamping device.

Alternatively, the expansion clamping device may be in the form of an annular leaf spring. This spring is pre-loaded to a diameter smaller than the interior diameter of the pipe socket. For insertion of a rubber sleeve containing a pre-loaded annular leaf spring, the manipulator is provided with suitable retaining devices allowing a controlled expansion of the leaf spring just when the rubber sleeve has reached its desired position and is to be pressed against the interior wall of the house drain pipe (and against the interior wall of the pipe socket, where applicable) to create a waterproof seal therewith.

BRIEF DESCRIPTION OF THE DRAWINGS

The foregoing as well as further advantages of the invention are explained hereinbelow on the basis of several embodiments shown in the accompanying drawings, wherein.

DETAILED DESCRIPTION OF THE PREFERRED EMBODIMENTS

Figure 1:
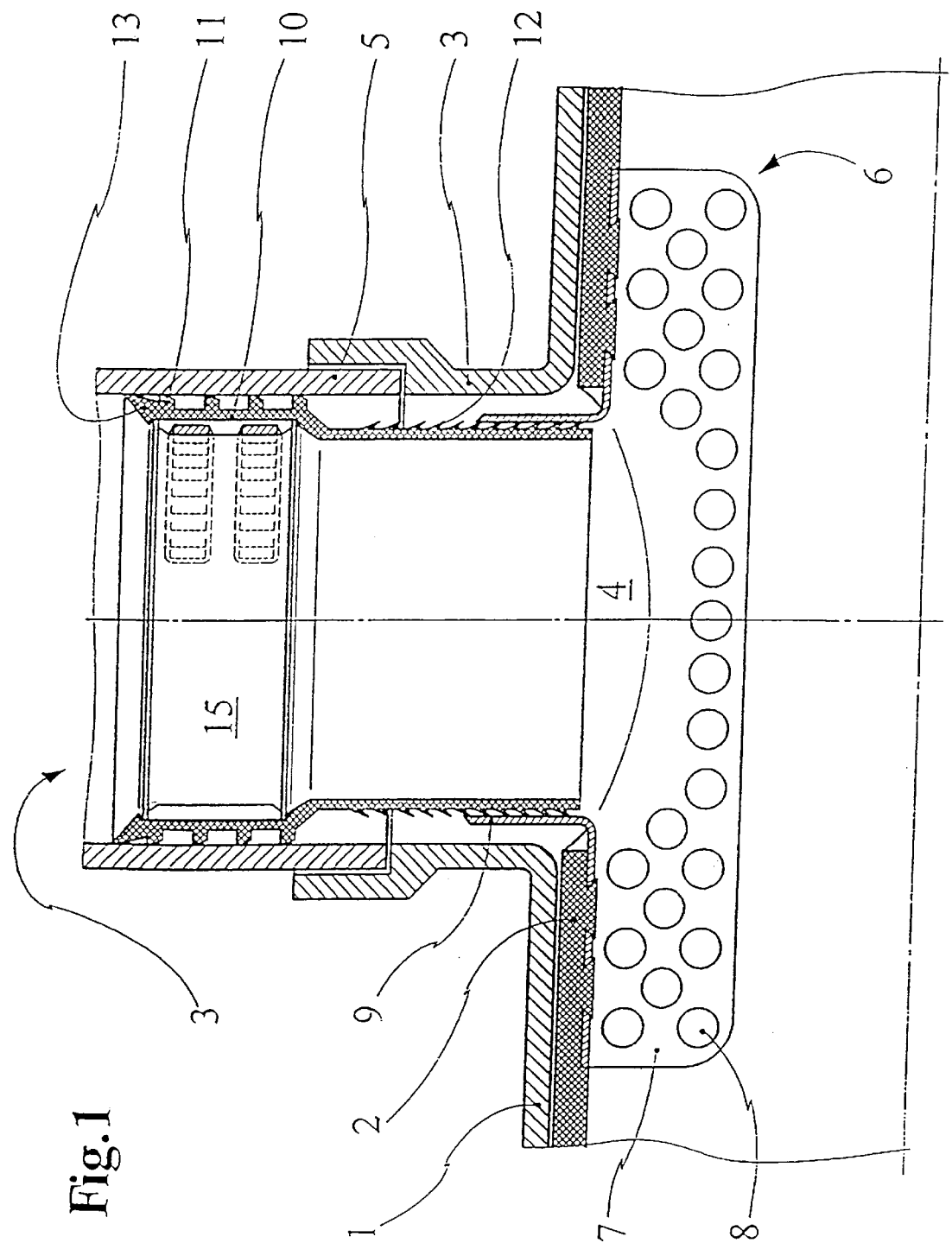
FIG. 1 shows a section through a 90-degree tee junction of a house drain pursuant of the present invention.

FIG. 1 shows a section of a sewer pipe 1 from which a house drain inlet 3 branches off at an angle of approx. 90 degrees. A plastic pipe 2 has been inserted into the sewer pipe 1 for rehabilitation thereof. Inserted into the house drain inlet 3 is a house drain pipe 5. In the area of the house drain inlet 3, the plastic pipe 2 has a through-hole 4 with a diameter which, in the embodiment shown, is slightly larger than the projection of the cross section of the house drain inlet 3. It will be appreciated that in the embodiment illustrated, the saddle-type branch fitting 6 which consists of a pipe segment member 7 and a pipe socket 9 integral therewith, projects approximately centrally into the house drain inlet 3. Except for an annular area circumscribing the base of the pipe socket 9, the pipe segment member 7 has a plurality of holes 8 with edges expanding conically from the outside toward the inside thereof, as can be clearly seen in the sectional view of these holes 8.

When the saddle-type branch fitting 6 is pressed against the heat-plasticized plastic pipe 2, the softened material is forced out through the holes 8 and engages their conical edges, thereby creating a form-fit engagement between the pipe segment member 7 and the plastic pipe 2. The annular area around the base of the pipe socket 9 is kept free from holes to avoid any communication between the interior of the pipe 2 and the interspace between the pipe segment member 7, the pipe socket 9, and the sewer pipe 1 or house drain inlet 3, respectively. This is best achieved by ensuring that the non-perforated annular area is of larger diameter than the through-hole 4 and extends beyond the latter over its entire circumference.

Inserted into the house drain inlet 3 is a rubber sleeve 10, with its sewer-side end located entirely within the pipe socket 9. The purpose of this rubber sleeve 10 is to seal the house drain inlet 3 against the sewer pipe 1 and/or the plastic pipe 2 lining the latter, respectively, as well as against the saddle-type branch fitting 6. The rubber sleeve 10 is arranged so that the sealing ribs 12 provided on the exterior surface of its sewer-side end rest against the pipe socket 9, while the sealing lips 11 provided on the exterior surface of its front end, as well as the sealing cone 13, rest against the house drain pipe 5. Tight contact of the sealing lips 11 and the sealing cone 13 is promoted by an expansion clamping element 15 fitted in this area within the rubber sleeve 10, there being provided, in one specific embodiment of the invention, a matching recess for this element 15 in the inner surface of the rubber sleeve 10. In the embodiment illustrated, this function is performed by a self-locking clamping ring 15 overlapping in its circumferential direction, which clamping ring 15 is here shown in its expanded and locked position.

Figure 2:
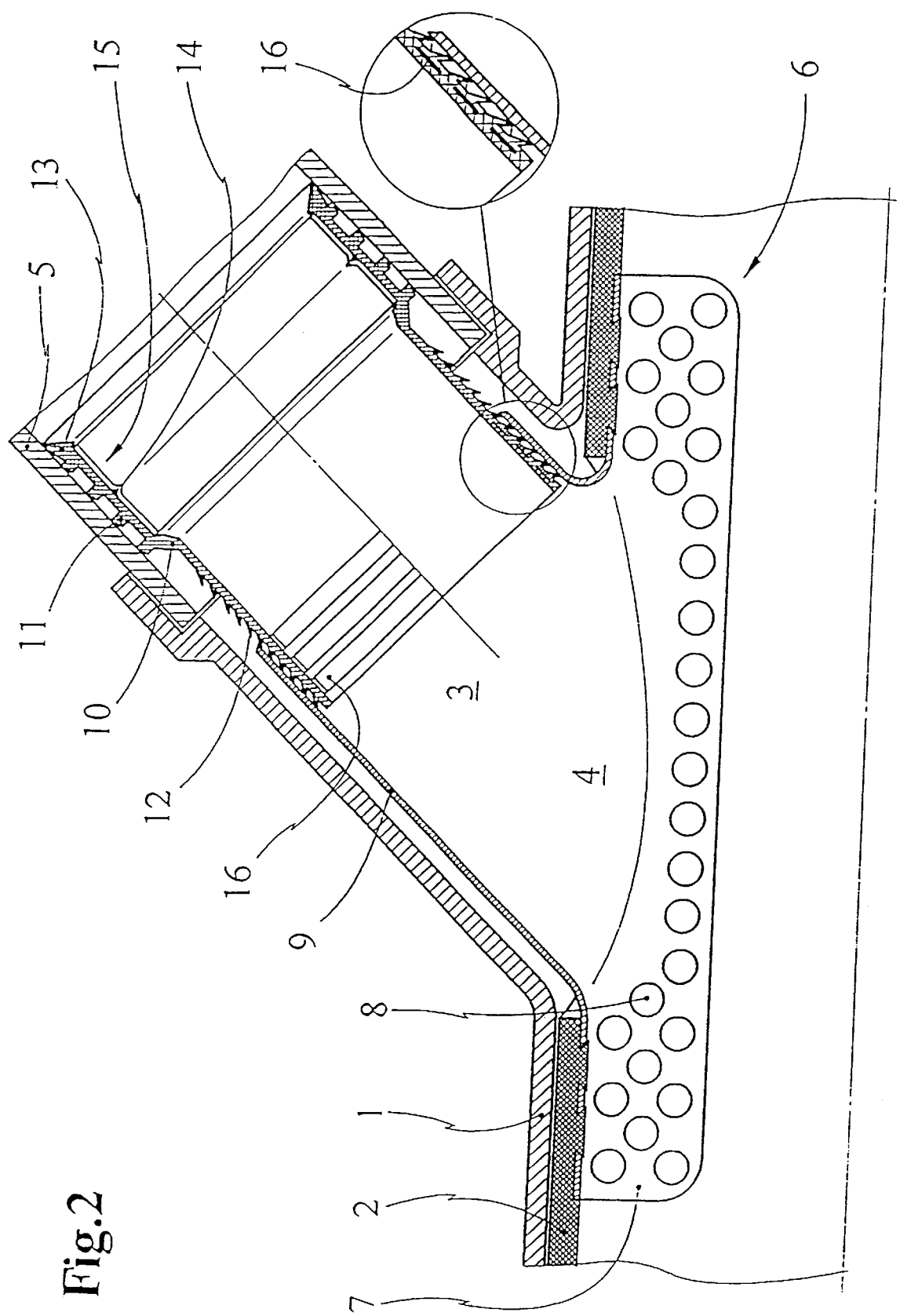
FIG. 2 shows a house drain junction extending at approx. 45 degrees.

FIG. 2 shows the sewer pipe 1 with a lateral inlet 3 arranged at an angle of approx. 45 degrees. The general arrangement is largely the same as in FIG. 1, although key differences lie in the fact that the expansion clamping device 15 is in this case an annular leaf spring which overlaps approximately twice and has an inwardly directed bead 14 in its circumferential direction, and that portion of the rubber sleeve 10 whose exterior sealing ribs 12 rest firmly against the pipe socket 9 comprises a plurality of stiffeners 16. These stiffeners 16 are in the form of separate annular elements in the left-hand portion of the illustration and in the form of integrated elements in the right-hand portion thereof, with a particularly good view of the integrated stiffeners 16 being provided in the enlarged detail. It will also be easily appreciated that the rubber sleeve 10 lies fully within the house drain inlet 3 and does not project into the sewer pipe 1. In FIGS. 1 and 2, the end of the rubber sleeve 10 bearing the sealing ribs 12 is shown in a condition in which the ribs are just barely bent and the rubber sleeve 10 is spaced from the pipe socket 9 by a certain amount. In practice it may be advantageous to ensure that the rubber sleeve 10 is pressed more closely against the pipe socket 9.

FIGS. 1 and 2 do not reflect a case in which the house drain inlet 3 lies in an area where the sewer pipe and branch inlet may be exposed to ground water pressure. In such a case, illustrated in FIG. 3, it may be advantageous to provide an additional expansion clamping device 15 on the sewer-side end of the rubber sleeve 10 as well, just as on its opposite end. The rubber sleeve 10 shown in this illustration is of a different shape, lacking the recesses in its interior surface for accommodation of the expansion clamping device 15 whose beads compress the sleeve 10 between the sealing lips 11. The expansion clamping device 15 provided on the sewer-side end securely guides this portion of the sleeve 10 and keeps the sealing ribs 12 pressed firmly against the pipe socket 9, which is welded into the fitting in this case. The pipe segment member 7, too, is of different design than the one shown in FIG. 1. It consists of a pipe segment member 7 made of thin, flexible sheet metal which extends over the entire circumference in the sealing area. Its exterior surface is textured to provide an appropriate macro-roughness (indicated by the hatched lines marked 8a). This can be advantageously achieved by a thin layer of expanded metal spot-welded to the outside of the pipe segment member, or by the use of other perforated or porous sheet material.

Figure 3:
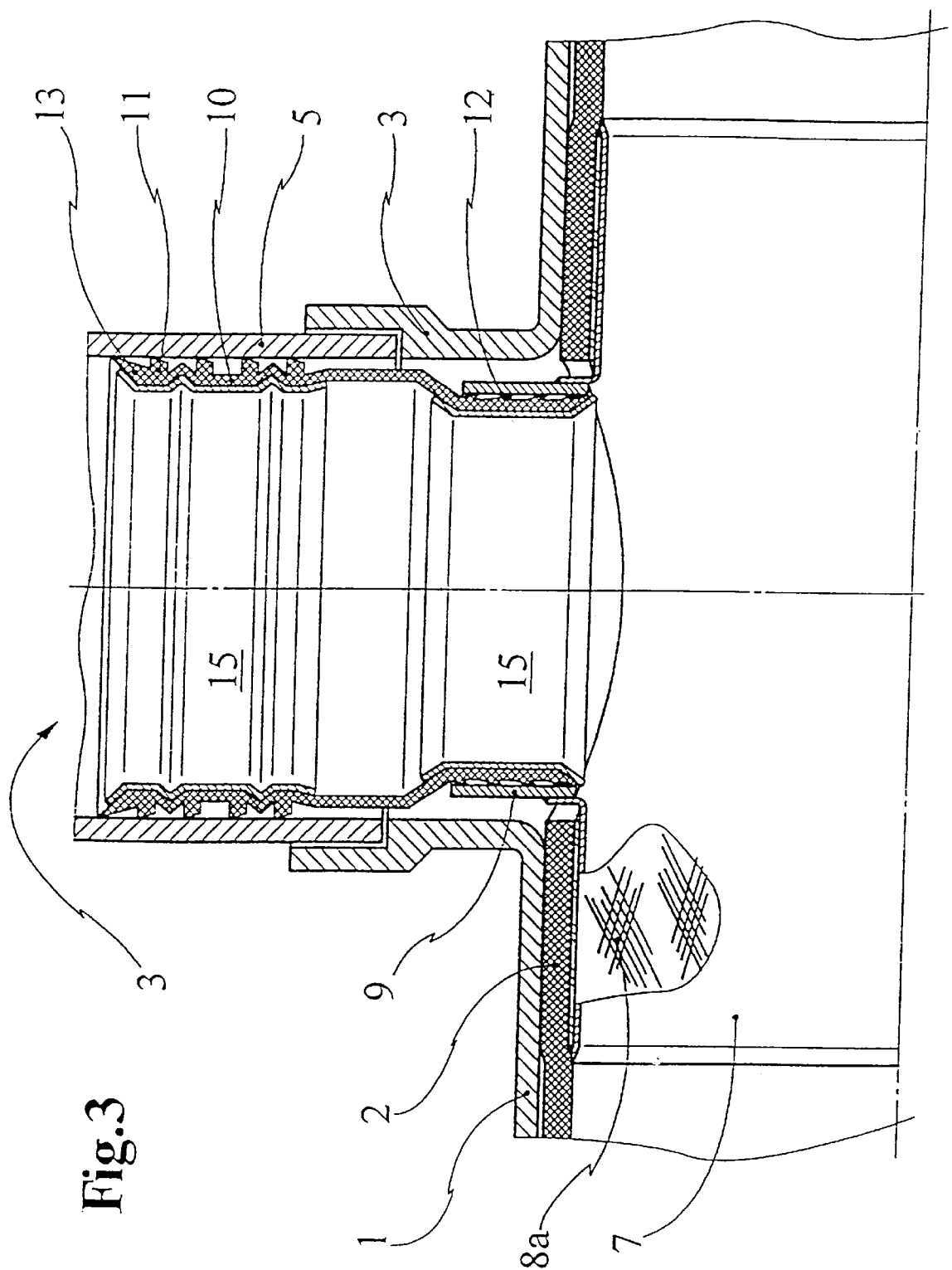
FIG. 3 shows another embodiment of a 90-degree tee junction of a house drain.

In will furthermore be appreciated from FIG. 3 that the pipe segment member 7 has been pressed radially into position in a manner resulting in a diameter expansion of the liner 2 in the area of contact. In the example shown, this has caused the liner to rest against the interior wall of the sewer pipe. The axial side edges of the pipe segment member 7 are slightly beveled, which provides a very smooth transition toward the non-covered portion of the liner 2. On the whole, the reduction in pipe cross-section caused by the saddle-type branch fitting has been kept very small so as to produce no significant flow restriction.

Figure 4:
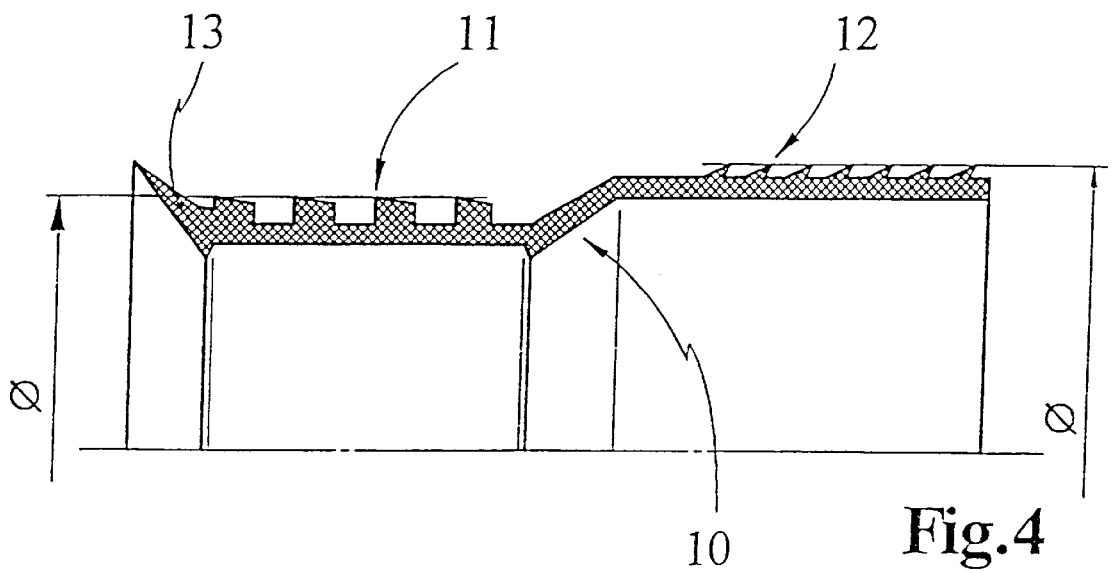
FIG. 4 shows an embodiment of the rubber sleeve.

FIG. 4 shows the rubber sleeve 10 in its original condition. It is clearly evident that, when the rubber sleeve 10 is not compressed, the portion carrying the sealing lips 11 is smaller in diameter than the portion comprising the sealing ribs 12, while in FIGS. 1 and 2 the end portion with the sealing lips 11 is larger in diameter owing to the action of the expanded clamping ring 15 or leaf spring 15, respectively. The diameter of the pointed end of the sealing cone 13, in the uncompressed state, is equal to or slightly smaller than the inside diameter of the house drain pipe 5.

Figure 5:
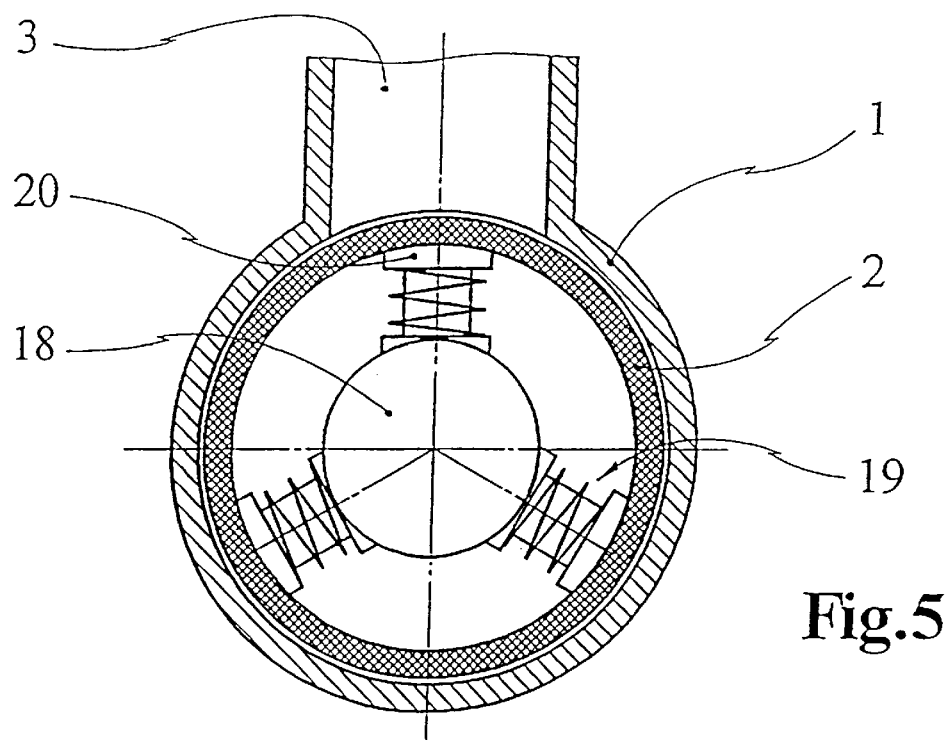
FIG. 5 shows a schematic front view of the manipulator in its axial direction.

FIG. 5 shows a very schematic view of a manipulator 18, which in its non-actuated condition is held approximately in the center of the sewer pipe 1 lined with plastic piping 2, through the action of the springs 19 provided on its three guiding legs. These three legs, which are equipped with sliding or roll-type elements 20 at their outward ends, are arranged at least at the front and rear axial ends of the manipulator 18. Inside the sewer pipe 1 the manipulator 18 is positioned so that one leg is essentially aligned radially with the axis of the house drain inlet 3. When the manipulator 18 or its operating elements are required to exert a pressure in the direction of the house drain inlet 3, the manipulator 18 may rest against the pipe side opposite from the house drain inlet for support if the pressure forces should exceed the force of the spring 19.

Figure 6:
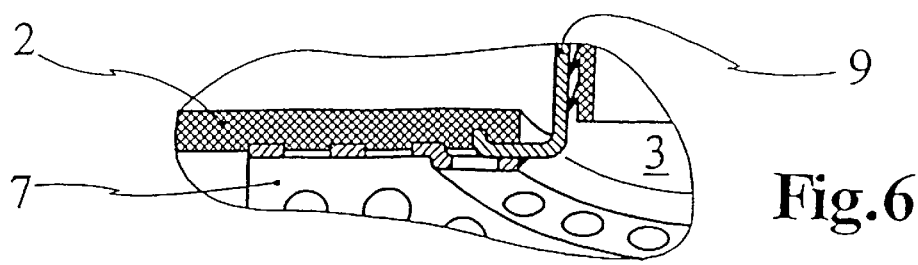
FIG. 6 shows a sectional view of an alternative embodiment of the saddle-type branch fitting.

FIG. 6 is a sectional view of another embodiment of the saddle-type branch fitting 6, wherein a prefabricated drawn pipe socket 9 is joined to the pipe segment member 7 by means of a fillet weld. The pipe segment member 7 is made of perforated sheet metal drawn slightly downwards in an annular pattern around an orifice. The outer end of the pipe socket a forms a beaded flange with an outwardly upstanding edge. An advantage of this design is that the non-perforated bead area acts as an annular portion sealing off the branch inlet, as it were, while the upstanding edge can be pressed deeply into the plasticized material, thereby providing an effective connecting and sealing edge.

Figure 7:
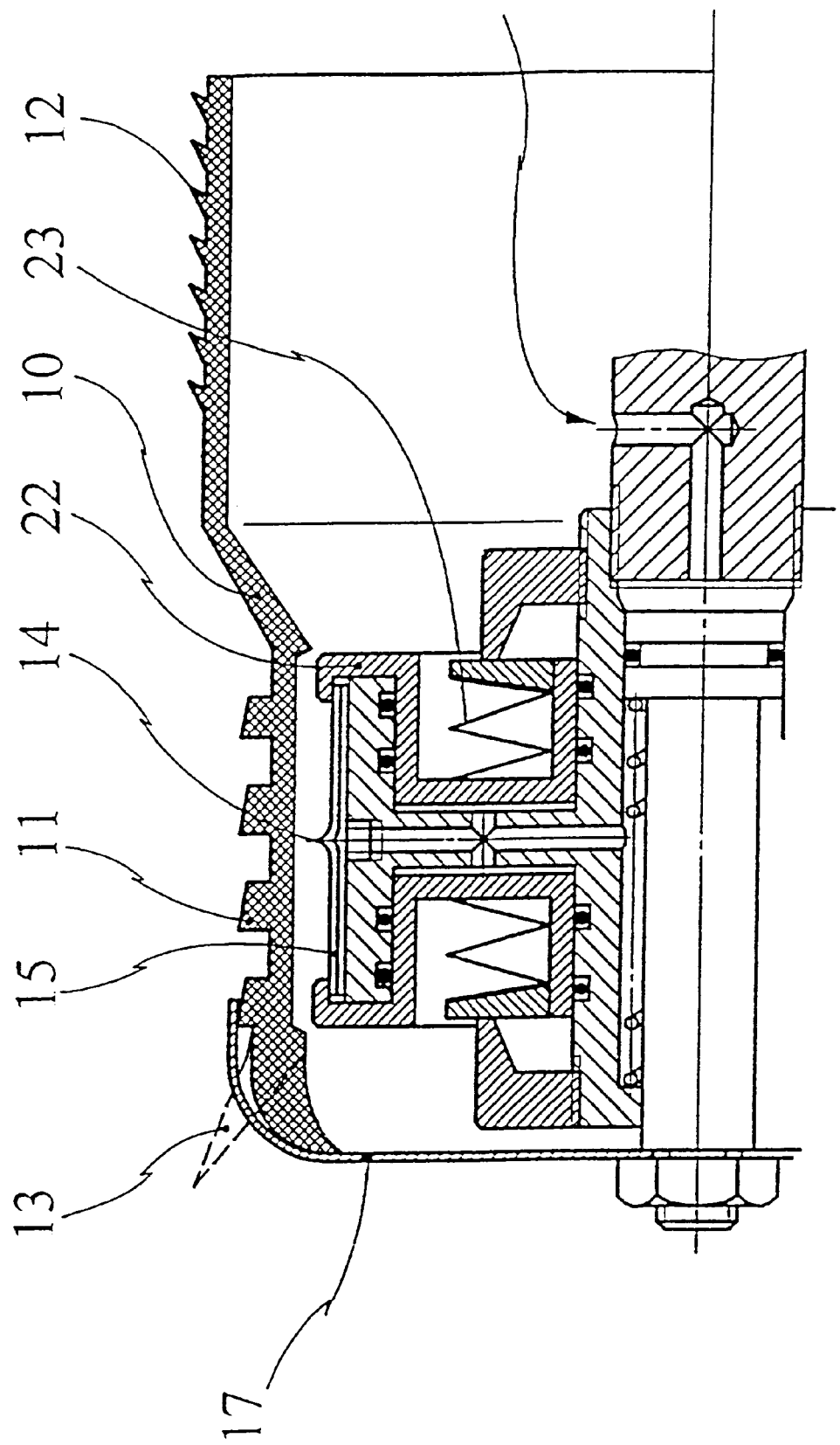
FIG. 7 shows a manipulator operating element for placement of the rubber sleeve.

FIG. 7 shows an embodiment of that operating element of the manipulator 18 which allows the rubber sleeve 10 to be positioned in the house drain inlet 3. It will be easily appreciated that the annular leaf spring 15, provided with outwardly projecting beads 14 in this embodiment, is still being held in its tensioned state by retaining jaws 22. The device comprises a spring clamping cap 17 which bends the sealing cone 13 inwards during assembly.

Once the device has been inserted into the house drain inlet 3 far enough for its ribbed end to be firmly applied in sufficient width and with full surface contact inside the pipe socket a and the end portion provided with the sealing lips 11 and sealing cone 13 is on a level with the house drain pipe 5, the positioning device is pneumatically pressurized via its compressed air port 21, causing an initial advance of the center bolt 30 with the spring clamping cap 17 attached thereto, until the spring clamping cap 17 has fully released the rubber sleeve 10, i.e., the sealing cone 13 thereof. The annular spring leaf 15 remains clamped in the retaining jaws 22 during this cycle. As further air pressure is applied to the piston, resulting in its forward movement against the resistance of what is here illustrated as a helical spring 31, the compressed air supply is directed into the compressed air duct between the spring elements 23 or into the housing accommodating the latter, respectively. This supply of compressed air forces the housing apart against the bias of the spring elements 23 until the retaining jaws 22 release the circular spring 15, allowing the latter to expand. As a result of this process, the rubber sleeve portion carrying the sealing lips 11 is expanded until the sealing cone 13 and the sealing lips 11 are placed firmly against the house drain pipe 5. The device can now be freely retracted from the house drain inlet 3.

I claim:

1. A process for rehabilitating a sewer pipe, comprising the steps of:
   inserting a thermoplastic inner liner pipe into the sewer pipe;
   closing off any incoming house drain inlet;
   connecting the liner pipe to said house drain inlet by creating a through-hole in that area of the liner pipe which closes off the house drain line, the through-hole having a size at least as large as a cross-section of a house drain pipe;
   positioning a metal saddle-type branch fitting, comprising a pipe segment member having a textured exterior surface and a pipe socket integral therewith and outwardly extending therefrom, in the through-hole so that the pipe socket projects into the house drain inlet;
   securing the pipe segment member to the plastic liner pipe by heating the plastic pipe to a plastification point in an area of contact with the saddle-type branch fitting and pressing the pipe segment member radially outwardly so as to become attached through form-fit engagement to the plastic liner pipe by said texture of its exterior surface; and
   inserting a sleeve having exterior sealing elements into the incoming house drain inlet so that one end portion of the sleeve is placed tightly against an interior wall of the house drain pipe while the other end portion of the sleeve is placed tightly against an interior wall of the pipe socket.

2. A process as defined in claim 1, wherein the saddle-branch fitting is made of stainless steel.

3. A process as defined in claim 1, wherein the step of inserting a sleeve includes inserting a sleeve made of an elastic material and pressing the sleeve into sealing engagement with the house drain pipe by an expansion clamping device.

4. A process as defined in claim 1, wherein the securing step includes directly heating the plastic liner pipe and then pressing the saddle-type branch fitting against the plasticized liner plate.

5. A process as defined in claim 4, including heating the plastic liner pipe with an infrared lamp.

6. A process as defined in claim 1, wherein the securing step includes heating the pipe segment member and pressing it against the plastic liner pipe for heating the plastic liner pipe to the plastification point.

7. A process as defined in claim 1, wherein the securing step includes pressing the pipe segment member radially into position with a packer unit so that the plastic liner pipe is slightly expanded in the area of contact and so that the inside surface of the pipe segment member does not project radially inwards to a significant extent beyond the inside surface of the plastic liner pipe.

8. A device for rehabilitating a sewer pipe by inserting a thermoplastic liner pipe into the sewer pipe, closing off an incoming house drain inlet and subsequently connecting the liner to the house drain inlet, said device comprising:
   a metal saddle-type branch fitting having a pipe segment member carrying a pipe socket integral therewith and outwardly extending therefrom; and
   a sleeve with outwardly disposed sealing elements on its end portions for sealing the house drain inlet, the pipe segment member being a sheet metal panel configured so as to extend significantly beyond the house drain inlet both axially and circumferentially and match a diameter of the plastic liner pipe, the pipe socket having an outside diameter slightly smaller than an inside diameter of the house drain inlet, the sleeve being made of an elastic material.

9. A device as defined in claim 8, wherein the saddle-type branch fitting is made of stainless steel and the sleeve is made of rubber.

10. A device as defined in claim 8, wherein the pipe segment member has an exterior surface with a plurality of orifices provided so as to give texture to the exterior surface in all areas except in an annular area surrounding the pipe socket, the orifices being configured so as to have edges that expand conically from the exterior surface toward an interior surface of the pipe segment member.

11. A device as defined in claim 10, wherein a through-hole having a circumference is provided in the liner pipe, the annular area of the pipe segment member which does not have orifices having an exterior circumference larger than the circumference of the through-hole.

12. A device as defined in claim 8, wherein the pipe segment member has a textured exterior surface so as to form a certain macro roughness, and a hydraulically smooth interior surface.

13. A device as defined in claim 12, and further comprising a perforated sheet material tack welded to the pipe segment member so as to form the macro roughness of said exterior surface.

14. A device as defined in claim 8, wherein the saddle-type branch fitting is configured to extend less than 180° in its circumferential direction and is bent into a geometrically stable shape which matches the circumferential curvature of the inner liner pipe.

15. A device as defined in claim 8, wherein the saddle-type branch fitting is made of a flexible metal having a circumferential length corresponding substantially to an interior circumference of the inner liner pipe, and is rollable into a tubular shape in which ends of the branch fitting overlap one another so as to form a diameter that is significantly less than the inner diameter of the inner liner pipe, so that the branch fitting can be expanded by a radially outwardly directed pressure.

16. A device as defined in claim 8, and further comprising expansion clamping means for pressing the rubber seal into sealing engagement with an interior wall of the house drain pipe.

17. A device as defined in claim 16, wherein the expansion clamping means is a self-locking, open-type clamping ring having circumferentially overlapping ends.

18. A device as defined in claim 16, wherein the expansion clamping means is an annular leaf spring which overlaps approximately twice in its circumferential direction.

19. A device as defined in claim 18, wherein the annular leaf spring has at least one circumferential bead arranged to provide engagement to overlapping levels of the spring.

20. A device as defined in claim 8, and further comprising stiffening means for ensuring tight contact of the sealing elements with the interior wall of the pipe socket.

21. A device as defined in claim 20, wherein the stiffening means is made of a flexible material that is stiffer than rubber.

22. A device as defined in claim 20, wherein the stiffening means includes at least one ring integrated into the sleeve.

23. A device as defined in claim 22, wherein the at least one ring is flat.

24. A device as defined in claim 20, wherein the stiffening means includes at least one ring in direct surface contact with an interior circumference of the sleeve.

25. A device as defined in claim 24, wherein the at least one ring is flat.

26. A device as defined in claim 8, wherein the sealing element include sealing lips that are slightly tapered, and a pointed sealing cone arranged above the sealing lips, the sealing cone having a pointed end that extends upwardly and outwardly and has approximately a common diameter with the inside of the house drain pipe.

27. A device as defined in claim 26, and further comprising a spring clamping cap configured so as to clamp the sealing cone so that the pointed end is bent resiliently inwards.

28. A manipulator for rehabilitating a sewer pipe by inserting a thermoplastic inner liner pipe into the sewer pipe, closing off any incoming house drain inlet, connecting the line pipe to said house drain inlet by creating a through-hole in that area of the liner pipe which closes off the house drain line, the through-hole having a size at least as large as a cross-section of a house drain pipe, positioning a metal saddle-type branch fitting, comprising a pipe segment member having a textured exterior surface and a pipe socket integral therewith and outwardly extending therefrom, in the through-hole so that the pipe socket projects into the house drain inlet, securing the pipe segment member to the plastic liner pipe by heating the plastic pipe to a plastification point in an area of contact with the saddle-type branch fitting and pressing the pipe segment member radially outwardly so as to become attached through form-fit engagement to the plastic liner pipe by said texture of its exterior surface, and inserting a sleeve having exterior sealing elements into the incoming house drain inlet so that one end portion of the sleeve is placed tightly against an interior wall of the house drain pipe while the other end portion of the sleeve is placed tightly against an interior wall of the pipe socket, the manipulator being movable through the plastic liner pipe inserted into the sewer pipe, and comprising:

means for locating an exact position of an outgoing house drain inlet an the corresponding house drain pipe;

means for creating the through-hole in the liner pipe toward the house drain inlet;

means for positioning the saddle-type branch fitting so that the pipe socket projects into the house drain inlet; and means for securing the saddle-type branch to the plastic liner pipe in the area of contact so that the rubber sleeve is insertable both into the pipe socket and the house drain pipe so that the rubber sleeve with its exterior sealing elements is in sealing engagement with the interior wall of the house drain pipe in the front portion of the sleeve, and with the interior wall of the pipe socket in the rear portion of the sleeve.

29. A manipulator as defined in claim 28, wherein the securing means includes an operating element having length and angle measuring means as well as means for aligning and adjusting said operating element.

30. A manipulator as defined in claim 28, wherein the means for creating a through-hole includes an automatic milling cutter.

31. A manipulator as defined in claim 28, wherein the securing means includes an operating element operative for heating the pipe segment member.

32. A manipulator as defined in claim 28, wherein the securing means includes an operating element operative to heat the contact area on the plastic liner pipe.

33. A manipulator as defined in claim 28, wherein the positioning means is operatively configured to position the saddle-type branch fitting with appropriate longitudinal and angular precision in the plastic liner pipe, the securing means including means for pressing the saddle-type branch fitting against the plastic liner pipe so that the pipe segment member is secured to the inside of the plastic liner pipe while the pipe socket projects into and is substantially centered with the house drain pipe.

34. A manipulator as defined in claim 28, and further comprising means for aligning the rubber sleeve with an axis of the house drain pipe and for inserting the rubber sleeve into the pipe socket and the house drain pipe by a linear movement until a lower portion of the rubber sleeve adjoins the interior wall of the pipe socket extending from the saddle-type branch fitting while the upper portion of the rubber sleeve adjoins the interior wall of the house drain pipe, the bottom end of the rubber sleeve being located fully within the pipe socket.

35. A manipulator as defined in claim 28, and further comprising means for placing and expanding a self-locking clamping ring in the upper portion of the rubber sleeve, the clamping ring placing and expanding means being one of mechanically, pneumatically and hydraulically actuated.

36. A manipulator as defined in claim 28, and further comprising means for positioning an annular leaf spring which is preloaded to a reduced diameter within the rubber sleeve and for expanding the leaf spring so that it exerts radial pressure on areas of the rubber sleeve necessary for obtaining a waterproof seal.

37. A manipulator as defined in claim 28, and further comprising a three-legged suspension system wherein each leg is separately spring mounted, the legs being radially arranged in an approximately equidistant circumferential relationship and being configured for one of sliding and rolling movement along an interior wall of the plastic liner pipe, one of the legs being alignable with the house drain inlet, the springs for the legs having a travel and force such that in a load-free state of the manipulator the manipulator is held at a center of the liner pipe but is restable against an opposite inner wall of the liner pipe so as to provide support during pressing of the saddle-type branch fitting into position.

* * * * *